United States Patent
Hur et al.

(10) Patent No.: US 10,467,933 B2
(45) Date of Patent: Nov. 5, 2019

(54) DISPLAY DEVICE AND IMAGE DISPLAYING METHOD THEREFOR

(71) Applicant: SAMSUNG ELECTRONICS CO., LTD., Suwon-si (KR)

(72) Inventors: Jae-myung Hur, Seongnam-si (KR); Hye-suk Kim, Suwon-si (KR); Jong-jin Park, Suwon-si (KR); Jae-sung An, Suwon-si (KR); Hyun-kyu Yun, Seoul (KR); Myoung-il Lee, Suwon-si (KR); Bong-seok Lee, Suwon-si (KR); Dae-woo Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/761,692

(22) PCT Filed: Oct. 31, 2016

(86) PCT No.: PCT/KR2016/012416
§ 371 (c)(1),
(2) Date: Mar. 20, 2018

(87) PCT Pub. No.: WO2017/078356
PCT Pub. Date: May 11, 2017

(65) Prior Publication Data
US 2018/0350281 A1      Dec. 6, 2018

(30) Foreign Application Priority Data

Nov. 2, 2015   (KR) .......................... 10-2015-0153243

(51) Int. Cl.
*G06T 7/62*     (2017.01)
*G09G 3/00*     (2006.01)
(Continued)

(52) U.S. Cl.
CPC ............. *G09G 3/001* (2013.01); *G06T 5/006* (2013.01); *G06T 7/74* (2017.01); *G06T 7/90* (2017.01);
(Continued)

(58) Field of Classification Search
CPC .... G06T 7/62; G06T 7/74; G06T 7/90; G06T 5/006; H04N 21/42202; H04N 21/4223; H04N 21/44218
See application file for complete search history.

(56) References Cited

U.S. PATENT DOCUMENTS

| 8,611,596 B2 | 12/2013 | Kim et al. |
| 2012/0013646 A1 | 1/2012 | Ichioka et al. |

(Continued)

FOREIGN PATENT DOCUMENTS

| CN | 102124730 A | 7/2011 |
| CN | 103517106 A | 1/2014 |

(Continued)

OTHER PUBLICATIONS

Written Opinion dated Feb. 13, 2017, issued by the International Searching Authority in counterpart International Patent Application No. PCT/KR2016/012416 (PCT/ISA/237).

(Continued)

*Primary Examiner* — Antonio A Caschera
(74) *Attorney, Agent, or Firm* — Sughrue Mion, PLLC

(57) ABSTRACT

A display device according to an embodiment of the present disclosure comprises: a display disposed on the front surface of the display device; a front camera for capturing a user located in front of the display device; a rear camera for capturing a wall surface positioned behind the display device; a sensor unit for measuring the distance between the display device and the wall surface; and a processor for determining a position of the user with regard to the captured
(Continued)

image of the user, and for controlling the display to display an image corresponding to a partial area of the wall surface existing in the direction in which the display device is located with respect to the position of the user in the captured images of the wall surface.

17 Claims, 16 Drawing Sheets

(51) Int. Cl.
*H04N 5/262* (2006.01)
*G06T 7/73* (2017.01)
*G06T 7/90* (2017.01)
*G06T 5/00* (2006.01)
*G09G 5/10* (2006.01)

(52) U.S. Cl.
CPC ............... *G09G 5/10* (2013.01); *H04N 5/262* (2013.01); *G06T 2207/10024* (2013.01); *G09G 2354/00* (2013.01); *G09G 2360/144* (2013.01)

(56) References Cited

U.S. PATENT DOCUMENTS

| | | | | |
|---|---|---|---|---|
| 2012/0218321 | A1* | 8/2012 | Ake | G09G 3/3406 345/690 |
| 2012/0249741 | A1* | 10/2012 | Maciocci | G06F 3/011 348/46 |
| 2014/0267434 | A1* | 9/2014 | Kuncl | H04N 21/4122 345/660 |
| 2014/0368692 | A1 | 12/2014 | Luizetto Pinto et al. | |
| 2015/0135090 | A1 | 5/2015 | Park | |
| 2016/0073033 | A1* | 3/2016 | Ogasawara | A63F 13/428 348/207.1 |
| 2017/0017361 | A1* | 1/2017 | Ballard | H04W 76/10 |

FOREIGN PATENT DOCUMENTS

| | | | |
|---|---|---|---|
| JP | 8-43030 A | 2/1996 | |
| JP | 2003-333301 | * 12/2006 | ............... H04N 7/14 |
| JP | 2006-333301 A | 12/2006 | |
| KR | 10-2005-0066791 A | 6/2005 | |
| KR | 10-2005-0073806 A | 7/2005 | |
| KR | 10-2009-0075234 A | 7/2009 | |
| KR | 10-2011-0079969 A | 7/2011 | |
| KR | 10-2012-0063987 A | 6/2012 | |
| KR | 10-2014-0135386 A | 11/2014 | |
| KR | 10-2015-0020409 A | 2/2015 | |
| KR | 10-2015-0054156 A | 5/2015 | |
| WO | 2015/056932 A1 | 4/2015 | |

OTHER PUBLICATIONS

International Search Report dated Feb. 13, 2017, issued by the International Searching Authority in counterpart International Patent Application No. PCT/KR2016/012416 (PCT/ISA/210).
Communication dated Oct. 15, 2018, issued by the European Patent Office in counterpart European Application No. 16862372.6.
Communication dated Aug. 1, 2019, from the State Intellectual Property Office of People's Republic of China in counterpart Application No. 201680027366.5.

* cited by examiner

FIG. 4
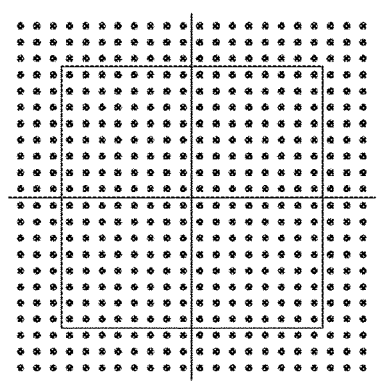
(a)
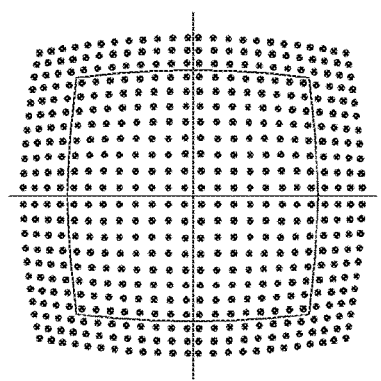
(b)

FIG. 6
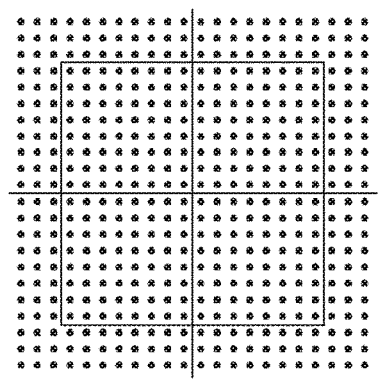
(a)
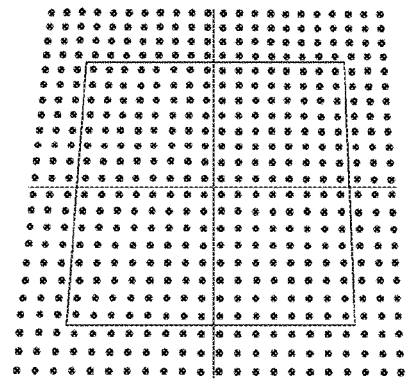
(b)

FIG. 16
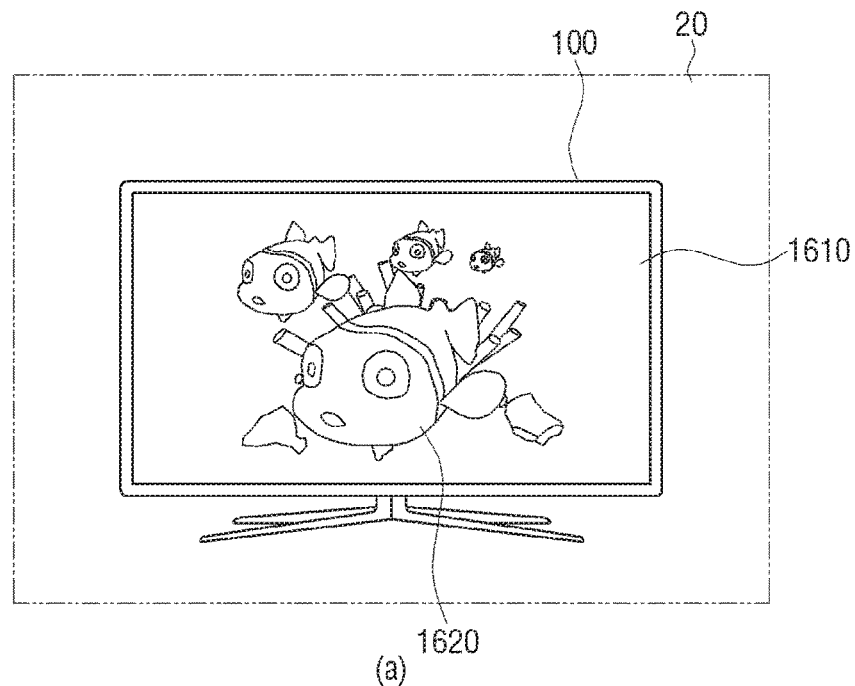
(a)
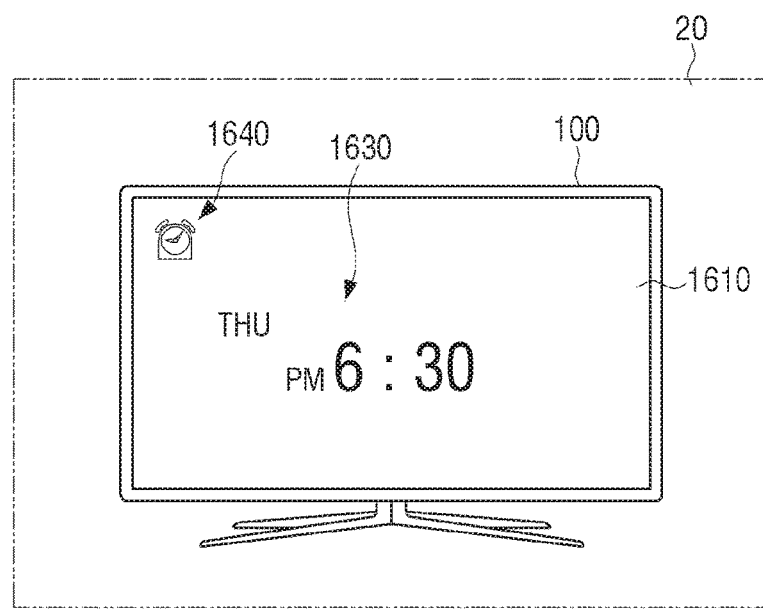
(b)

DISPLAY DEVICE AND IMAGE DISPLAYING METHOD THEREFOR

BACKGROUND OF THE INVENTION

Field of the Invention

Devices and methods consistent with what is disclosed herein relate to a display device and an image displaying method thereof, and more particularly, to a display device for displaying an image in harmony with surroundings of the display device and an image displaying method thereof.

Description of the Related Art

A display device for displaying an image has been widely used as a home appliance such as a television, a monitor, a home theater, etc. In addition, technology for the display device has been developed to output a larger size screen with higher image quality than before.

As such, a display device having an excellent high-resolution image quality and a large size screen enables a user for viewing an image to experience a deep immersion. On the contrary, a large size screen in black of the display device, which is turned off while the user is not viewing the image, is not in harmony with surroundings and gives a sense of incompatibility to the user.

SUMMARY OF THE INVENTION

An aspect of the exemplary embodiments relates to providing a display device for displaying an image in harmony with surroundings of the display device and an image displaying method thereof.

According to an exemplary embodiment, there is provided a display device including a display disposed on a front surface of the display device, a front camera configured to capture a user in front of the display device, a rear camera configured to capture a wall surface positioned behind the display device, a sensor unit configured to measure a distance between the display device and the wall surface, and a processor configured to determine a position of the user based on a captured image of the user and control the display to display an image corresponding to a partial area of the wall surface in a direction where the display device is positioned with reference to the position of the user of a captured image of the wall surface based on the position of the user and the distance between the display device and the wall surface.

The partial area of the wall surface may be a partial area of the wall surface hidden by the display device of the wall surface positioned in the direction where the display device is positioned with reference to the position of the user.

The processor, based on the captured image of the user, may calculate a direction and a distance from the display device to the position of the user, determine a position of the image corresponding to the partial area of the wall surface of the captured image of the wall surface based on the calculated direction from the display device to the position of the user, determine a size of the image corresponding to the partial area of the wall surface of the captured image of the wall surface by using a ratio between the calculated distance from the display device to the position of the user and a size of the front surface of the display device, and the measured distance between the display device and the wall surface, and control the display to display an image according to the determined position and size.

The processor, based on the captured image of the user, with reference to a center of the display, may calculate an angle of rotation from a vertical axis of a tangent plane of the display in a direction of the position of the user and a distance from the center of the display to the position of the user, calculate a viewing angle for viewing an entire front surface of the display device at the calculated distance on the vertical axis, calculates a width and a height of the partial area of the wall surface hidden by the display device when the rotated angle is added to the calculated viewing angle, and control the display to display an image having a size corresponding to the calculated width and height of the captured image.

The rear camera may include a wide angle lens, and the processor may compensate barrel distortion of the captured image of the wall surface caused by the wide angle lens and control the display to display the image corresponding to the partial area of the wall surface of a compensated image of the wall surface.

The rear camera may capture a rear view of the display device in a direction forming an angle with a vertical axis of a tangent plane of the display, compensate keystone distortion of the captured image of the wall surface caused by a capturing direction, and control the display to display the image corresponding to the partial area of the wall surface of the compensated image of the wall surface.

The processor may analyze a pattern and a color of the wall surface based on the captured image of the wall surface, generate an image including the analyzed color and pattern, and control the display to display the image corresponding to the partial area of the wall surface in the direction where the display device is positioned with reference to the position of the user of the generated image based on the position of the user and the distance between the display device and the wall surface.

The processor may analyze a pattern and a color of the wall surface based on the captured image of the wall surface, search an image having the analyzed pattern of pre-stored images, and based on the position of the user and the distance between the display device and the wall surface, control the display to display the image corresponding to the partial area of the wall surface in the direction where the display device is positioned with reference to the position of the user of the retrieved image.

The processor may control the display to display a screen including a picture or an animation having the image corresponding to the partial area of the wall surface as background or a widget executing a specific application.

The display device may further include a light sensor configured to sense light amount, and the processor may control the display to adjust brightness for displaying the image corresponding to the partial area of the wall surface according to the sensed light amount.

According to an exemplary embodiment, there is provided a method of displaying an image of a display device, the method may include capturing a user positioned in front of the display device and a wall surface positioned behind the display device, measuring a distance between the display device and the wall surface, determining a position of the user based on a captured image of the user, and displaying an image corresponding to a partial area of the wall surface in a direction where the display device is positioned with reference to the position of the user of a captured image of the wall surface, based on the position of the user and the distance between the display device and the wall surface.

The partial area of the wall surface may be a partial area of the wall surface hidden by the display device of the wall surface in the direction where the display device is positioned with reference to the position of the user.

The determining of the position of the user may include based on the captured image of the user, calculating a direction and a distance from the display device to the position of the user, and the displaying may include determining a position of the image corresponding to the partial area of the wall surface of the captured image of the wall surface based on the calculated direction from the display device to the position of the user, determining a size of the image corresponding to the partial area of the wall surface of the captured image of the wall surface by using a ratio between the calculated distance from the display device to the position of the user and a size of a front surface of the display device, and the measured distance between the display device and the wall surface, and displaying an image corresponding to the determined position and size.

The determining of the position of the user may include, based on the captured image of the user, with reference to a center of the display, calculating an angle of rotation from a vertical axis of a tangent plane of the display to the position of the user and a distance between the center of the display and the position of the user, and the displaying may include calculating a viewing angle for viewing an entire front surface of the display device at the calculated distance on the vertical axis, calculating a width and a height of the partial area of the wall surface hidden by the display device when the rotated angle is added to the calculated viewing angle, and displaying an image having a size corresponding to the calculated width and height of the captured image.

The wall surface may be captured by a rear camera including a wide angle lens, and the displaying may include compensating barrel distortion of the captured image of the wall surface due to the wide angle lens and displaying the image corresponding to the partial area of the wall surface of the compensated image of the wall surface.

The capturing may include capturing a back of the display device in a direction forming an angle with a vertical axis of a tangent plane of a display disposed on a front surface of the display device, and the displaying may include compensating keystone distortion of the captured image of the wall surface caused by a capturing direction and displaying the image corresponding to the partial area of the wall surface of the compensated image of the wall surface.

The displaying may include analyzing a pattern and a color of the wall surface based on the captured image of the wall surface, generating an image including the analyzed color and pattern, and based on the position of the user and the distance between the display device and the wall surface, displaying the image corresponding to the partial area of the wall surface in the direction where the display device is positioned with reference to the position of the user of the generated image.

The displaying may include analyzing the pattern and the color of the wall surface based on the captured image of the wall surface, searching an image having the analyzed pattern of pre-stored images, and based on the position of the user and the distance between the display device and the wall surface, with reference to the position of the user of the retrieved image, displaying the image corresponding to the partial area of the wall surface in the direction where the display device is positioned.

The displaying may include displaying a picture and an animation having the image corresponding to the partial area of the wall surface as background or a widget executing a specific application.

The method of displaying the image may further include sensing light amount and the displaying may include adjusting brightness for displaying the image corresponding to the partial area of the wall surface according to the sensed light amount.

A display device and an image displaying method thereof according to various exemplary embodiments may achieve effects described below.

According to an exemplary embodiment, a display device may output an image in harmony with a wall surface behind the display device and avoid desolate indoor atmosphere due to a black screen of the conventional display device.

According to another exemplary embodiment, the display device may function as indoor interior in harmony with the wall surface and ensure expanded usability using various applications.

BRIEF DESCRIPTION OF THE DRAWINGS

FIG. 4 is a view provided to explain barrel effect produced by a wide angle lens;

FIG. 6 is a view provided to explain keystone distortion caused by a capturing direction;

FIG. 16 is a view illustrating two examples of a screen of a display device according to an exemplary embodiment.

DETAILED DESCRIPTION OF EXEMPLARY EMBODIMENTS

Figure 1:
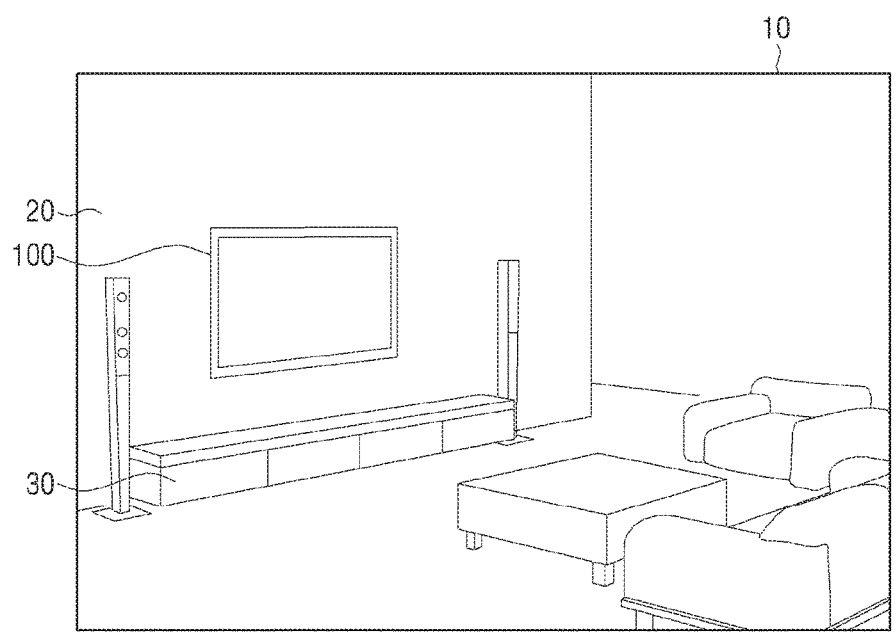
FIG. 1 is a view provided to explain a typical usage of a display device according to an exemplary embodiment.

Hereinafter, exemplary embodiments will be described in greater detail with reference to the accompanying drawings. In describing exemplary embodiments, detailed description of relevant known functions or components may be omitted if it would obscure the description of the subject matter.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

FIG. 1 is a view provided to explain a typical usage of a display device according to an exemplary embodiment.

FIG. 1 illustrates a living room 10 where a home theater is installed. A display device 100 constituting the home theater may be installed on one side of a wall surface 20 of the living room 10. The display device 100 of FIG. 1 may be shown as a wall type display device. In another exemplary embodiment, the display device 100 may be installed on a shelf 30 that is placed under the wall surface 20.

The display device 100 may be installed to display a screen toward inner space of the living room 10. The display device 100 may display an image in harmony with the wall surface 20. Specifically, the display device 100 may display an image corresponding to the wall surface 20 in a standby state or a power saving state where video contents such as broadcasting, are not played.

Such the display device 100 may be not a black screen hung on the wall surface 20 by itself, but may output the image in harmony with the wall surface 20.

Figure 2:
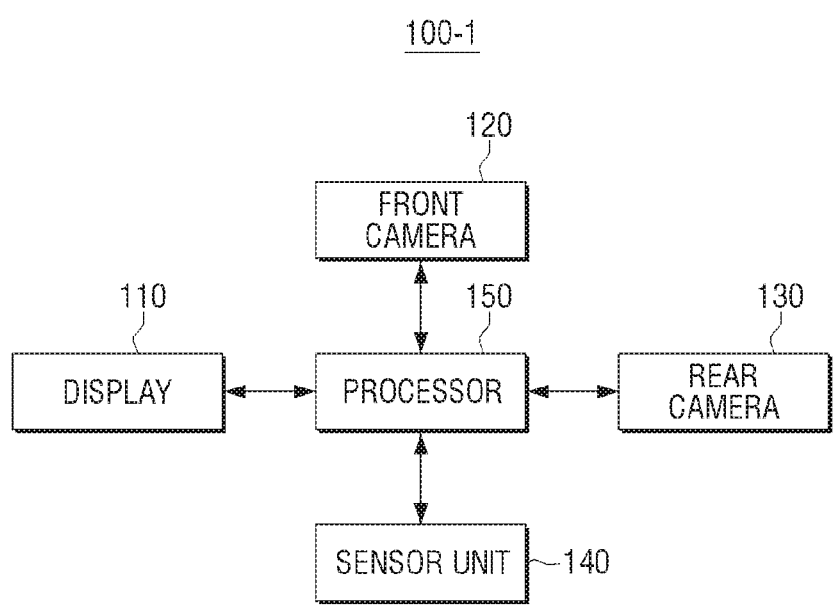
FIG. 2 is a block diagram provided to explain configuration of a display device according to an exemplary embodiment.

FIG. 2 is a block diagram provided to explain configuration of a display device according to an exemplary embodiment.

Referring to FIG. 2, a display device 100-1 may include a display 110, a front camera 120, a rear camera 130, a sensor unit 140 and a processor 150.

The display 110 may display an image. In addition, the display 110 may be disposed on a front surface of the display device 100-1. Specifically, the display 110 may display an image corresponding to background, that is, an image in harmony with the wall surface.

The display 110 may be embodied as various display units such as a Liquid Crystal Display panel (LCD panel), a Plasma Display Panel (PDP), an Organic Light Emitting Diode (OLED), a Vacuum Fluorescent Display (VFD), a Field Emission Display (FED), an Electro Luminescence Display (ELD), and the like.

The front camera 120 may capture a user in front of the display device 100-1. Specifically, the front camera 120 may capture a subject including the user toward a front of the display device 100-1.

The rear camera 130 may display a wall surface behind the display device 100-1. Specifically, the rear camera 120 may capture a rear wall, which is the background of the space where the display device 100-1 is installed.

The front camera 120 and the rear camera 130 may consist of a lens for collecting light of the subject incident from the bottom and causes an optical image to be formed in an image area, an image pickup element for converting the light incident through the lens into an electric signal, and an A/D converter for photoelectric conversion of a signal in an analog form of the image pickup element into a digital signal and outputting of the digital signal. The image pickup element may be a Charge Coupled Device (CCD) image pickup element or a Complementary Metal Oxide Semiconductor (CCD) image pickup element.

The sensor unit 140 may measure a distance. Specifically, the sensor unit 140 may measure a distance between the display device 100-1 and the wall surface. The sensor unit 140 may measure a space between the display device 100-1 and the wall surface, which is the background, and thus identify how far the display device 100-1 is away from the wall surface captured by the rear camera 130.

The sensor unit 140 may sense a round trip distance of the irradiated infrared rays, and be embodied as an IR sensor for measuring a distance from the wall surface. In addition, the sensor unit 140 may be embodied as an optical sensor for sensing the distance from the wall surface, that is, a subject for automatic focus included in the rear camera 130.

The processor 150 may control each component of the display device 100-1. Specifically, the processor 150 may control each component for performing a function of outputting an image of the display device 100-1.

The processor 150 may determine a position of the user based on a captured image of the user. Specifically, the processor 150 may determine the position of the user based on an image of in front of the display device 100-1, which is captured by the front camera 120.

To this end, the processor 150 may recognize the user based on the image captured by the front camera 130. For example, the processor 150 may performing a human recognition process or a face recognition process from the image.

In addition, the processor 150 may use a pre-stored position of the front camera 120 for capturing the user to determine the position of the user. Specifically, the processor 150 may use a position where the front camera 120 is disposed in design to determine the relative position of the user with regard to the display device 100-1. Meanwhile, the processor 150 may determine positions of a plurality of users when the plurality of users are captured, determine an average of the determined positions of the plurality of users as the position of the user.

The processor 150 may calculate a direction and a distance from the display device to the position of the user based on the captured image of the user.

The processor 150 may control the display 110 to display an image corresponding to a partial area of the wall surface in a direction where the display device 100-1 is positioned with reference to the position of the user of the captured image of the wall surface based on the position of the user and the distance between the display device 100-1 and the wall surface.

Specifically, the processor 150, based on the position of the user, which is determined by the image where the front is captured by the front camera 120, and the distance between the display device 100-1 and the wall surface, which is measured by the sensor unit 140, may edit the image corresponding to the partial area of the wall surface in the direction where the display device 100-1 is positioned with reference to the position of the user of the captured image of the wall surface. In addition, the processor 150 may control the display 110 to display the edited image.

The partial area of the wall surface may be a partial area of the wall surface hidden by the display device 100-1, of the wall surface in the direction where the display device 100-1 is positioned with reference to the position of the user. In other words, the partial area of the wall surface may refer to a partial area hidden by the display device 100-1 of the wall surface behind the display device 100-1 on the same view line when the user views the display device 100-1 at the user's position.

The processor 150 may determines a position of the image corresponding to the partial area of the wall surface of the captured image of the wall surface based on the calculated direction from the display device to the position of the user. Specifically, the processor 150 may determine the partial area hidden by the display device 100-1, which varies depending on the direction of the position of the user, and the position of the image corresponding to the partial area of the captured image of the wall surface.

In addition, the processor 150 may determine a size of the image corresponding to the partial area of the wall surface of the captured image of the wall surface by using a ratio between the calculated distance between the display device and the position of the user and a size of a front surface of the display device, and the measured distance between the display device and the wall surface. Specifically, the processor 150 may determine the size of the image corresponding to the partial area of the wall surface of the captured image of the wall surface based on that a ratio between the partial area of the wall surface, which is hidden by the display device 100-1, and the area of the front surface of the display device 100-1 corresponds to a ratio between the distance between the display device 100-1 and the position of the user and the distance between the wall surface and the position of the user.

In addition, the processor 150 may control the display 110 to display an image corresponding to the determined position and size.

In another example for determining the area to be displayed, the processor 150, based on the captured image of the user, with reference to a center of the display 110, may calculate an angle of rotation from a vertical axis of a tangent plane of the display 110 to the position of the user and a distance between the center of the display 110 and the position of the user. In other words, the processor 150 may form a three dimensional coordinate system consisting of a width axis and a height axis on a plane of the display 110 and a vertical axis perpendicular to the plane. The processor 150 may indicate the position of the user in terms of distance and direction, in the three-dimensional coordinate system, with the center of the display 110 as an origin point.

The processor 150 may calculate a viewing angle for viewing an entire front surface of the display device 100-1 at the calculated distance on the vertical axis. Specifically, the processor 150 may calculate the viewing angle for viewing the entire front surface of the display device 100-1 at a point on the vertical axis, which is separated by the distance from the position of the user.

In addition, the processor 150 may calculate a width and a height of the partial area of the wall surface hidden by the display device 100-1 when a rotated angle is added to the calculated viewing angle. Specifically, the processor 150 may add an angle of rotation from the point on the vertical axis to a width direction of the display 110 to a viewing angle in the width direction, add an angle of rotation from the point on the vertical axis to a height direction of the display 110 to a viewing angle in the height direction, and calculate a width and a height of the partial area of the wall surface, which are changed by the added viewing angle.

In addition, the processor 150 may control the display 110 to display an image having a size corresponding to the partial area of the calculated width and height of the captured image. The detailed description will be made with reference to FIG. 9.

The processor 150 may include a CPU, a Read-Only Memory (ROM) storing a control program for controlling the display device 100-1 and a Random Access Memory (RAM) to memorize a signal or data input from the outside of the display device 100-1 or to be used as a memory area for a job performed in the display device 100-1. The CPU may include at least one of a single-core processor, a dual-core processor, a triple-core processor and a quad-core processor. The CPU, ROM and RAM may be interconnected via an internal bus.

The display device 100 according to an exemplary embodiment of the present invention may output the image corresponding to the hidden partial area of the wall surface, which is in harmony with the rear wall.

Figure 3:
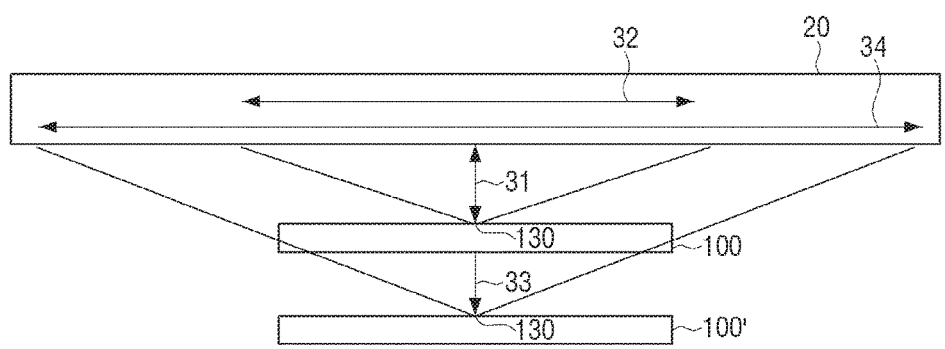
FIG. 3 is a view provided to explain an example of a method of capturing a wall surface by a display device.

FIG. 3 is a view provided to explain an example of a method of capturing a wall surface by a display device.

Referring to FIG. 3, the display device 100 may include the rear camera 130 behind the display device 100. In addition, the sensor unit 140 positioned at the same as or close to the rear camera 130 may calculate a distance 31 between the display device 100 and the wall surface 20.

Typically, the display device 100 may be installed at the distance 31 close to the wall surface 20. Therefore, the rear camera 130 may include a wide angle lens for capturing the wall surface 20 to be longer than a width of the display device 100.

The rear camera 130 may capture the wall surface 20 by a width corresponding to reference numeral 32 at the distance 31, which is close to the wall surface 20. The rear camera 130 of a display device 100', which is further away from the wall surface 20, may capture the wall surface 20 by a width corresponding to reference numeral 34 at a long distance 33. As such, an image of the wall surface captured by the rear view 130 may varies in size depending on a position where the display device 100 is located.

Therefore, the processor 150 of the display device 100 may determine the size of the image corresponding to the partial area of the wall surface in proportion to the measured distances 31 and 33.

For example, the processor 150 may calculate the size of the hidden area of the wall surface, which is in proportion to a distance between an optical position of the user and the wall surface on the assumption that the user is positioned at an optical distance and in a vertical direction from the display device 100 for viewing.

In the meantime, an image captured by the wide angle lens may be distorted. Referring to FIG. 4 for the detailed description, FIG. 4(A) is a normal image, and FIG. 4(B) is an image obtained by barrel distortion when captured by the wide angle lens.

Therefore, the processor 150 may compensate barrel distortion of the image of the wall surface 20 captured by the wide angle lens, and control the display 110 to display the image corresponding to the partial area of the wall surface of the compensated image of the wall surface.

Figure 5:
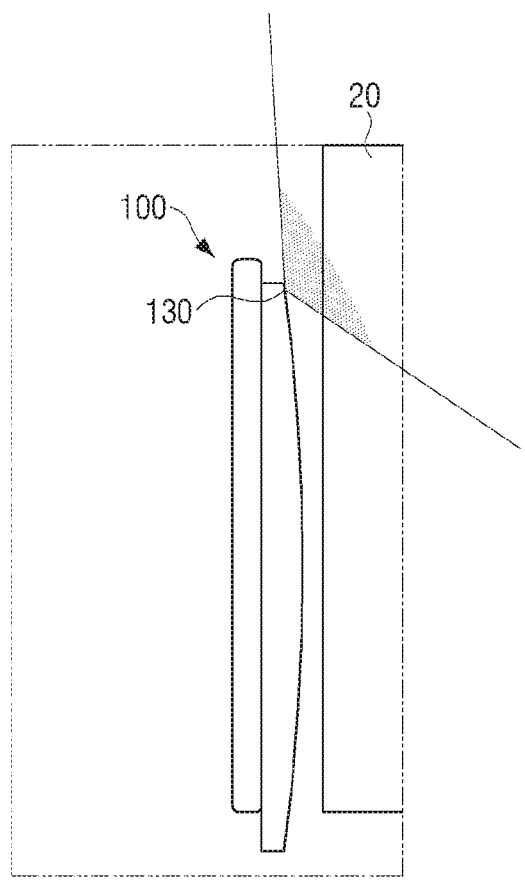
FIG. 5 is a view provided to explain another example of a method of capturing a wall surface by a display device.

FIG. 5 is a view provided to explain another example of a method of capturing a wall surface by a display device.

Referring to FIG. 5, the display device 100 may be installed very close to the wall surface 20. In such a case, it is difficult for the rear camera 130 to capture the image of the wall surface 20 larger than the display device 100 although the rear camera 130 is a ultra-close-up camera.

Therefore, the rear camera 130 may capture the wall surface in an oblique direction. Specifically, the rear camera 130 may capture the back of the display device 100 in a direction forming an angle with a vertical axis of a tangent plane of the display 110. As shown in an example of FIG. 5, the rear camera 130 positioned on an outer portion of a rear surface of the display device 100 may capture the wall surface 20 to form an angle in a upward direction, thereby capturing the image of the wall surface 20 having the large size.

The image of the wall surface 20, which is captured in the oblique direction is different from the image of the wall surface 20, which is captured in a direction where the user views the display device 100. Therefore, referring to FIG. 6, FIG. 6(A) is a normal image and FIG. 6(B) is an image obtained by keystone distortion (keystone distortion or trapezoidal distortion) when captured from downward to upward.

Therefore, the processor 150 may compensate keystone distortion of the captured image of the wall surface 20 due to a capturing direction, and control the display 10 to display the image corresponding to the partial area of the wall surface of the compensated image of the wall surface 20.

Figure 7:
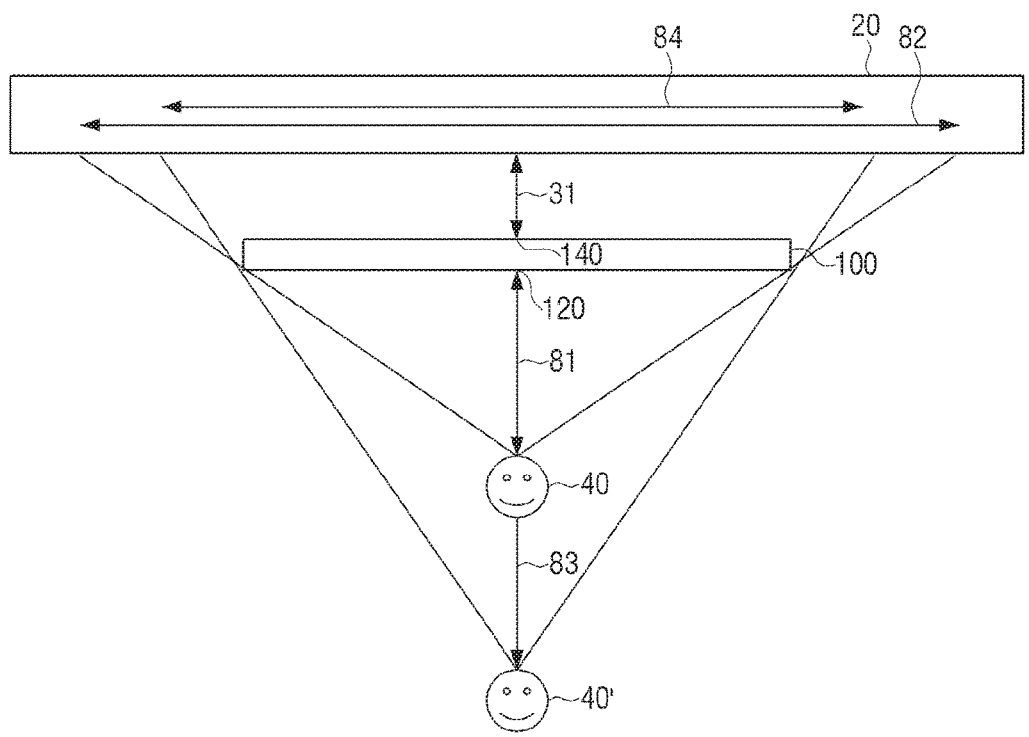
FIG. 7 is a view provided to explain change of a partial area of a wall surface hidden according to a distance between a display device and a position of a user.

FIG. 7 is a view provided to explain change of a partial area of a wall surface hidden according to a distance between a display device and a position of a user.

Referring to FIG. 7 the display device 100 may measure the distance 31 between the display device 100 and the wall surface 20 by using the sensor unit 140. In addition, the display device 100 may capture a user 40 in front of the display device 100 by using the front camera 120 and determine the position of the user 40, which is captured. Information on the determined position of the user 40 may include a distance 81 between the center of the display 110 and the position of the user 40.

The user 40 looking straight the display device 100 at the distance 81 close to the display device 100 may not see the partial area of the wall surface 20 having a relatively large size, which is reference numeral 82. However, the user looking straight the display device at a distance 83 away from the display device 100 may not see the partial area of the wall surface 20 having a relatively small size, which is reference numeral 84.

Therefore, the display device 100 may vary the size of the image corresponding to the partial area of the wall surface 20 to be displayed on the display 110 according to the distance from the user 40.

Figure 8:
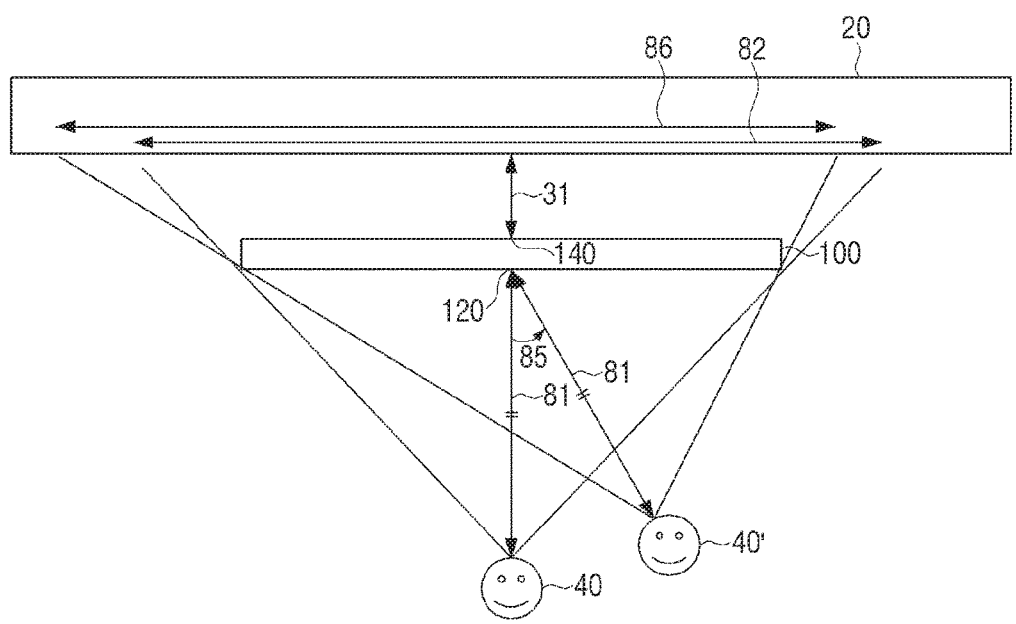
FIG. 8 is a view provided to explain change of a partial area of a wall surface hidden according to a direction from a display device to a position of a user.

FIG. 8 is a view provided to explain change of a partial area of a wall surface hidden according to a direction from a display device to a position of a user.

Referring to FIG. 8, the display device 100 may measure the distance 31 from the wall surface 20 by using the sensor unit 140. In addition, the display device 100 may capture the user 40 in front of the display device 100 by using the front camera 120 and determine the captured position of the user 40. Information on the determined position of the user 40 may include the distance between the center of the display 110 and the position of the user 40 and the direction forming an angle with a vertical axis of the center of the display 110.

The user 40 looking straight the display device 100 at a determined distance 81 on the vertical axis may not see the hidden partial area of the wall surface 20 symmetrical to the left and right of the reference numeral 82. A user 40' looking the display device 100 at a position forming a determined angle 85 with the vertical axis at the same distance 81 may not see the hidden partial area of the wall surface 20 of reference numeral 86.

Therefore, the display device 100 may vary the size and position of the image corresponding to the partial area of the wall surface 20 to be displayed on the display 110 according to the direction where the user 40 is positioned.

Figure 9:
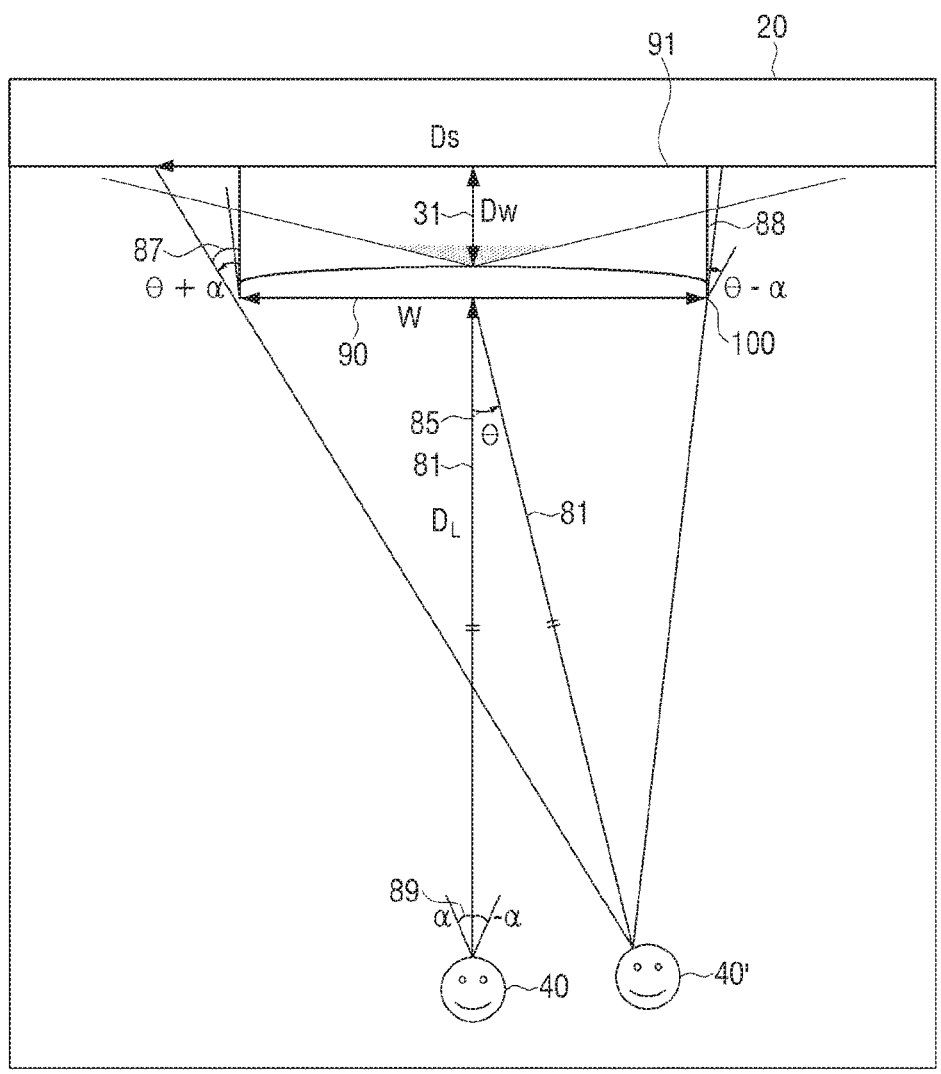
FIG. 9 is a view provided to explain a method of calculating a size of a hidden partial area of a wall surface according to an exemplary embodiment.

FIG. 9 is a view provided to explain a method of calculating a size of a hidden partial area of a wall surface according to an exemplary embodiment.

Referring to FIG. 9, the display device 100 may store a length of width W 90 of a width of the display 110 disposed on the front surface of the display device 100.

In addition, the display device 100 may measure a distance Dw 31, which is away from the wall surface 20, by using the sensor unit 140. In addition, the display device 100 may capture the user 40' by using the front camera 120 and determine the position of the user based on the captured image of the user. The determined position of the user 40' may be at a distance DL 81 from the center of the display 110, and in a direction rotated by θ 85 from a vertical axis perpendicular to the center of the display 110 to a width direction of a plane of the display 110.

The display device 100 may calculate a viewing angle α, where the user 40 views the entire front surface of the display device 100 at a position away from the display device 100 by the distance DL 81 on the vertical axis. Specifically, the processor 150 may calculate the viewing angle α of the user 40 of virtual reality, who views the display 110 at the calculated distance DL 81 away from the display device 100.

Equation for obtaining the viewing angle α is presented by as follow.

$$\alpha = \text{Arctan}((W/2)D_2) \qquad \text{Equation 1 [Formula 1]}$$

In a coordinate system shown in FIG. 9, orientation will be defined by that an angle rotating to the right is a positive number, and an angle rotating to the left is a negative number with reference to the vertical axis.

The display device 100 may calculate an angle 87 of a blind spot of the left of the display 110 and an angle 88 of a blind spot of the right of the display 110, which are invisible to the user 40'. Specifically, the processor 150 may add the angle θ 85 of the direction where the user 40' is located to the calculated viewing angles α and −α.

The display device 100 may calculate a width Ds 91 of the partial area of the wall surface 20 hidden by the display device 100 of the wall surface 20 in the direction where the display device 100 is located from the position of the user 40' based on the equation as follow.

$$D_S = D_W * (\tan(\theta + \alpha) + \tan(\theta - \alpha)) + W \qquad \text{Equation 2 [Formula 2]}$$

In the same manner, the display device 100 may calculate a height of the partial area of the wall surface 20 hidden by the display device 100 by adding an angle of the user 40's rotation in the height direction of the display 110 to a viewing angle in the height direction with a height of the display 110.

The display device 100 may calculate an area of the partial area of the wall surface 20 to be displayed on the display 110 from the calculated width Ds 91 and height. In addition, the display device 100 may determine a position corresponding to the partial area of the calculated area of the captured image based on the position and capturing range of the rear camera 130 for capturing the wall surface 20 behind the display device 100.

Figure 10:
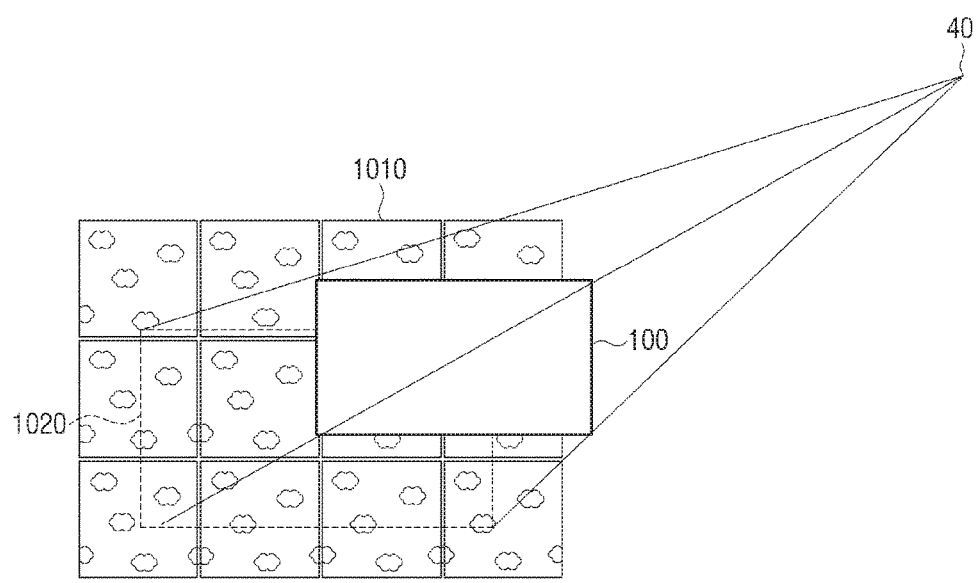
FIG. 10 is view provided to explain a partial image output from a display device according to an exemplary embodiment.

FIG. 10 is view provided to explain a partial image output from a display device according to an exemplary embodiment.

Referring to FIG. 10, the display device 100 may obtain a captured image 1010 of the wall surface 20 behind the display device 100.

In addition, the display device 100 may display an image 1020 corresponding to the partial area in the direction where the display device is located with reference to the position of the user 40 of the captured image 1010 of the wall surface 20.

As shown in 10 FIG. 10, when projecting from a point indicating the position of the user 40 toward the front surface of the display device 100, the image displayed on the display 110 may be the image 1020 corresponding to the partial area of the wall surface 20 hidden by the display device 100 of the captured image 1010 of the wall surface 20.

Figure 11:
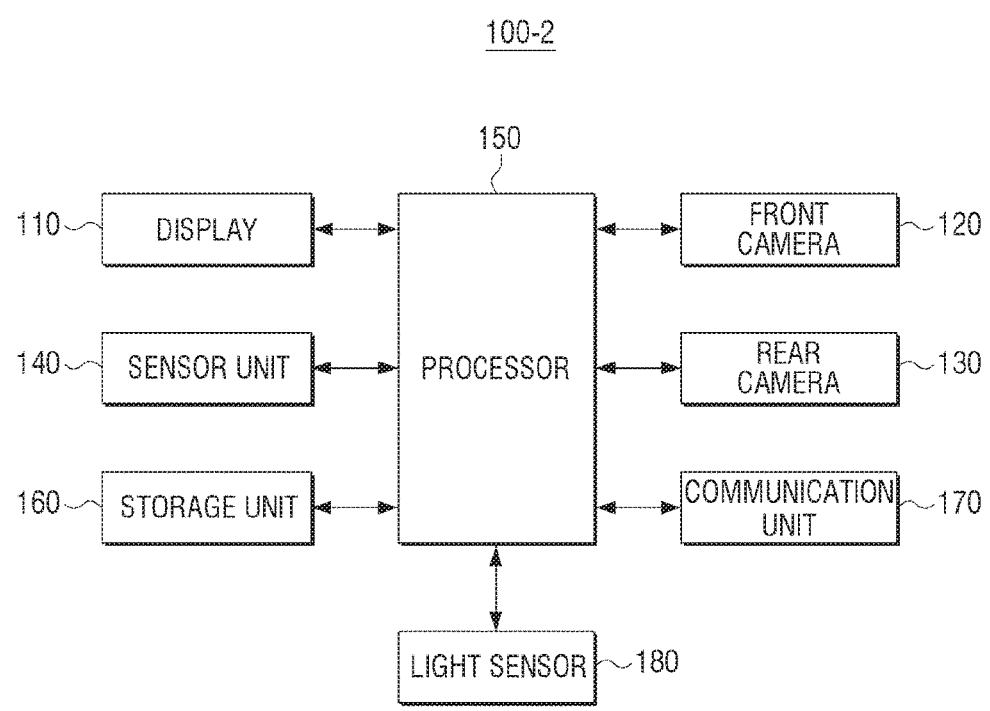
FIG. 11 is a block diagram provided to explain configuration of a display device according to an exemplary embodiment.

FIG. 11 is a block diagram provided to explain configuration of a display device according to an exemplary embodiment.

Referring to FIG. 11, a display device 100-2 may include the display 110, the front camera 120, the rear camera 130, the sensor unit 150, the processor 150, a storage unit 160, a communication unit 170 and a light sensor 180.

The display 110 may display a screen. In addition, the display 110 may be disposed on a front surface of the display device 100-2. The detailed configuration and function of the display 110 are the same as those of the display 110 in FIG. 2, and thus the detailed description thereof will be omitted to avoid repetition.

The front camera 120 may capture of the user 40 in front of the display device 100-2. The detailed configuration and function of the front camera 120 are the same as those of the front camera 120 of FIG. 2, and thus the detailed description will be omitted to avoid repetition.

The rear camera 130 may capture the wall surface 20 behind the display device 100-2. The detailed configuration and function of the rear camera 130 are the same as those of the rear camera 130 of FIG. 2, and thus the detailed description will be omitted to avoid repetition.

The sensor unit 140 may measure a distance between the display device 100-2 and the wall surface 20. The detailed configuration and function of the sensor unit 140 are the same as those of the sensor unit 140 of FIG. 2, and thus the detailed description will be omitted to avoid repetition.

The storage unit 160 may store image data. Specifically, the storage unit 160 may include data base where a plurality of images presenting the wall surface 20 are accumulated. For example, the storage unit 160 may store images presenting wall paper for covering the wall.

The storage unit 160 may store various application programs. For example, the storage unit 160 may store a program for providing a function of editing an image, a program for receiving and outputting broadcast signals, a video and audio output set up program, a program for setting a period of capturing a wall surface and a program for compensating barrel distortion and keystone distortion of the captured image. In addition, the storage unit 160 may include an image processing program for analyzing a pattern and a color of the image of the wall surface 20 that will be described below.

The storage unit 160 may be embodied as an auxiliary memory device mounted in the display device 100-2. For example, the storage unit 160 may be embodied as a hard disk driver and/or a solid state drive. The storage unit 150 may be embodied as an external detachable removable disk. For example, the storage unit 160 may be embodied as a flash memory disk for supporting a USB communication method. The storage unit 160 may be embodied as not only a physical memory device but also a web server through network communication.

The communication unit 170 may perform communication. Specifically, the communication unit 170 may provide interface for communicating with an external device of the display device 100-2. The communication unit 170 may communicate with a portable device such as a user terminal or a remote controller. In addition, the communication unit 170 may communicate with external servers through network.

The communication unit 170 may include various communication chips such as a Wi-Fi chip, a Bluetooth chip, an NFC chip, a wireless communication chip, and the like. The Wi-Fi chip, the Bluetooth chip, and the NFC chip each may perform communication by using a WiFi method, a Bluetooth method, and an NFC method. The NFC chip may perform communication in the Near Field Communication (NFC) method using 13.56 MHz band, among various RF-ID frequency bands such as 135 kHz, 13.56 MHz, 433 MHz, 860 to 960 MHz, and 2.45 GHz. In the case of using the Wi-Fi chip or the Bluetooth chip, various connection information such as an SSID, a session key, and the like may be first transmitted and received, and communication may be connected and performed by using the various connection information. The wireless communication chip may perform communication according to various communication standards such as IEEE, ZigBee, 3rd Generation (3G), 3rd Generation Partial Arena Project (3GPP), Long Term Evolution (LTE), and the like.

The light sensor 180 may sense brightness. Specifically, the light sensor 180 may sense an intensity of light incident from surroundings. The light sensor 180 may be embodied as a photoelectric cell that generates a photoelectric effect or a cathode tube.

The processor 150 may control each component of the display device 100-1. Since the processor 150 has the configuration and function of the processor 150 of FIG. 2, the detailed description thereof will be omitted.

In an exemplary embodiment of FIG. 2, the processor 150 may display the partial area of the captured image of the wall surface on the display 110. In another exemplary embodiment, the processor 150 may display another image on the display 110 based on the captured image of the wall surface.

The processor 150 may analyze the pattern and the color based on the captured image of the wall surface 20. Specifically, the processor 150 may perform image processing of the captured image of the wall surface by the rear camera 130, and analyze the pattern and color of the wall surface 20. For example, the processor 150 may apply a filter regarding the image of the wall surface 20 and perform edge detection for extracting high frequency component corresponding to discontinuous boundary portion. In addition, the processor 150 may perform blob labeling for forming a signal area (blob) to be distinguished from the captured image of the wall surface 20. The pattern of the wall surface 20 may be recognized based on the image of the wall surface where the blob labeling is performed. In addition, the processor 150, based on the captured image of the wall surface 20, may search a color code corresponding to a color of each distinguishable area.

The processor 150 may generate an image including the analyzed color and pattern. Specifically, the processor 150 may generate the image corresponding to the partial area of the wall surface 20 by using the analyzed pattern and color.

Specifically, the processor 150 may generate the image having the pattern analyzed based on the captured image, and an image of wall paper colored with at least one analyzed color in the generated image. In addition, the processor 150, based on the position of the user and the distance between the display device 100-2 and the wall surface 20, may control the display 110 to display the image corresponding to the partial area of the wall surface 20 in the direction where the display device 100-2 is positioned with reference to the position of the user 40 of the generated image. Meanwhile, the processor 150 may generate the image of the wall paper having the pattern and color corresponding to the partial area of the wall surface, which is hidden by the display device 100-2 at the position of the user 40 and control the display 110 to display the generated image.

In another exemplary embodiment, the processor 150 may search the image having the analyzed pattern of pre-stored images. Specifically, the processor 150 may search the image having the analyzed pattern of images pre-stored in data base. The processor 150 may search an image having a most similar pattern based on similarity between the captured image and the pre-stored images, although the patterns are not identical to each other.

In addition, the processor 150 may control the display 110 to display the image corresponding to the partial area of the wall surface 20 in the direction where the display device 100-2 is located with reference to the position of the user 40 of the retrieved image based on the position of the user 40 and the distance between the display device 100-2 and the wall surface 20. Additionally, the processor 150 may change a color of the retrieved image when the retrieved image is different from the captured image of the wall surface 20. Meanwhile, the processor 150 may perform editing for copying or rearranging the wall paper image to render the retrieved wall paper image to correspond to the partial area of the wall surface 20 hidden by the display device 100-2 from the position of the user 40, and control the display 110 to display the edited image.

The processor 150 may adjust brightness for displaying an image by the display 110 according to light amounts of surroundings. Specifically, the processor 150 may control the display 110 to adjust brightness for displaying the image corresponding to the partial area of the wall surface 20 according to the light amount sensed by the light sensor 180. The display device 100-2 may capture the wall surface 20 continuously or repeatedly at a predetermined interval by the rear camera 130. An image output from the display device 100-2 may vary depending on the change of lighting. However, the display device 100-2 may store the image of the wall surface 20 captured by the rear camera 130, and display the image corresponding to the partial area of the wall surface 20 based on the stored image. In such a case, the light sensor 180 may sense the light amount of surroundings such as the brightness of the lighting and vary the brightness of the image output from the display device 100-2 according to the sensed light amount.

The display device 100-2 according to an exemplary embodiment of the present invention may display the generated image of the wall surface 20 with high definition even by using the rear camera 130 having low capability. In addition, the display device 100-2 may be prevented from power consumption caused by continuous or periodical image capturing and display the image of the wall surface 20 in harmony with the brightness of surroundings by using the light sensor 180.

Figure 12:
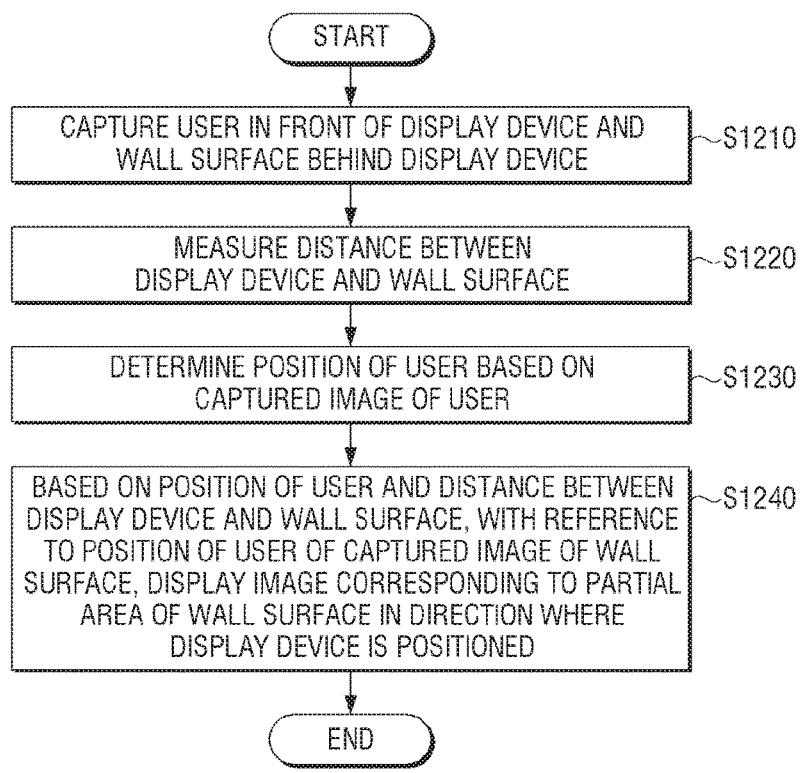
FIG. 12 is a view provided to explain a method of displaying an image according to an exemplary embodiment.

FIG. 12 is a view provided to explain a method of displaying an image according to an exemplary embodiment.

Referring to FIG. 12, a method of displaying an image may include capturing a user in front of the display device and a wall surface behind the display device (S1210). Specifically, the display device may capture one or more users in front of the display device and the wall surface behind the display device by using a camera.

A distance between the display device and the wall surface may be measured (S1220). Specifically, the display device may measure a distance from the captured wall surface by using a sensor.

In addition, a position of the user may be determined based on the captured image of the user (S1230). Specifically, the display device may determine the position including a distance and a direction from the display device to the user in front of the display device. To this end, step S1230 may include, based on the captured image of the user, calculating the direction and the distance from the display device to the position of the user. More specifically, based on the captured image of the user, with reference to a center of the display, the display device may calculate an angle of rotation from a vertical axis of a tangent plane of a display in the direction of the position of the user and the distance between the center of the display and the position of the user.

Based on the position of the user and the distance between the display device and the wall surface, with reference to the position of the user of the captured image of the wall surface, the display device displays an image corresponding to the partial area of the wall surface in a direction where the display device is located (S1240). Specifically, the display device may display the image corresponding to the partial area of the wall surface, which varies depend on the position of the user and the distance from the wall surface. The display device may determine the position of the image corresponding to the partial area of the wall surface of the captured image of the wall surface based on the calculated direction of the user, determine a size of the image corresponding to the partial area of the wall surface of the captured image of the wall surface by using a ratio between the calculated distance between the display device and the user and a size of a front surface of the display device and the measured distance between the display device and the wall surface, and display an image according to the determined position and size. In addition, the display device may calculate a viewing angle for viewing an entire front surface of the display device at the calculated distance between the display device and the position of the user on a vertical axis of a tangent plane of the display, calculate a width and a height of the partial area of the wall surface, which is hidden by the display device, when an angle of user's rotation is added to the calculated viewing angle, and display an image having a size corresponding to the calculated width and height of the captured image.

In the method of displaying the image, at step S1210, the rear camera for capturing a back of the display device may include a wide angle lens, and step S1240 may further include compensating barrel distortion of the image of the wall surface, captured by the wide angle lens.

At step S1210, the rear camera for capturing the back of the display device may capture the back of the display device in a direction forming an angle with a vertical axis of a tangent plane of the display disposed on a front surface of the display device. Step S1240 may further include compensating keystone distortion of the captured image of the wall surface due to an oblique capturing direction.

In another exemplary embodiment, the method of displaying the image may further include analyzing a pattern and a color of the wall surface based on the captured image of the wall surface. Step S1240 may include generating an image having the analyzed color and pattern, and displaying the image corresponding to the partial area of the wall surface in the direction where the display device is located with reference to the position of the user. In addition, step S1240 may include searching an image having the analyzed pattern of pre-stored images, and displaying the image corresponding to the partial area of the wall surface in the direction where the display device is located with reference to the position of the user of the retrieved image.

The method of displaying the image may further include sensing light amount, and step S1240 may further include adjusting brightness for displaying the image corresponding to the partial area of the wall surface according to the sensed light amount.

The method of displaying the image according to an exemplary embodiment may include outputting the image corresponding to the hidden partial area of the wall surface in harmony with the wall surface behind the display device.

Figure 13:
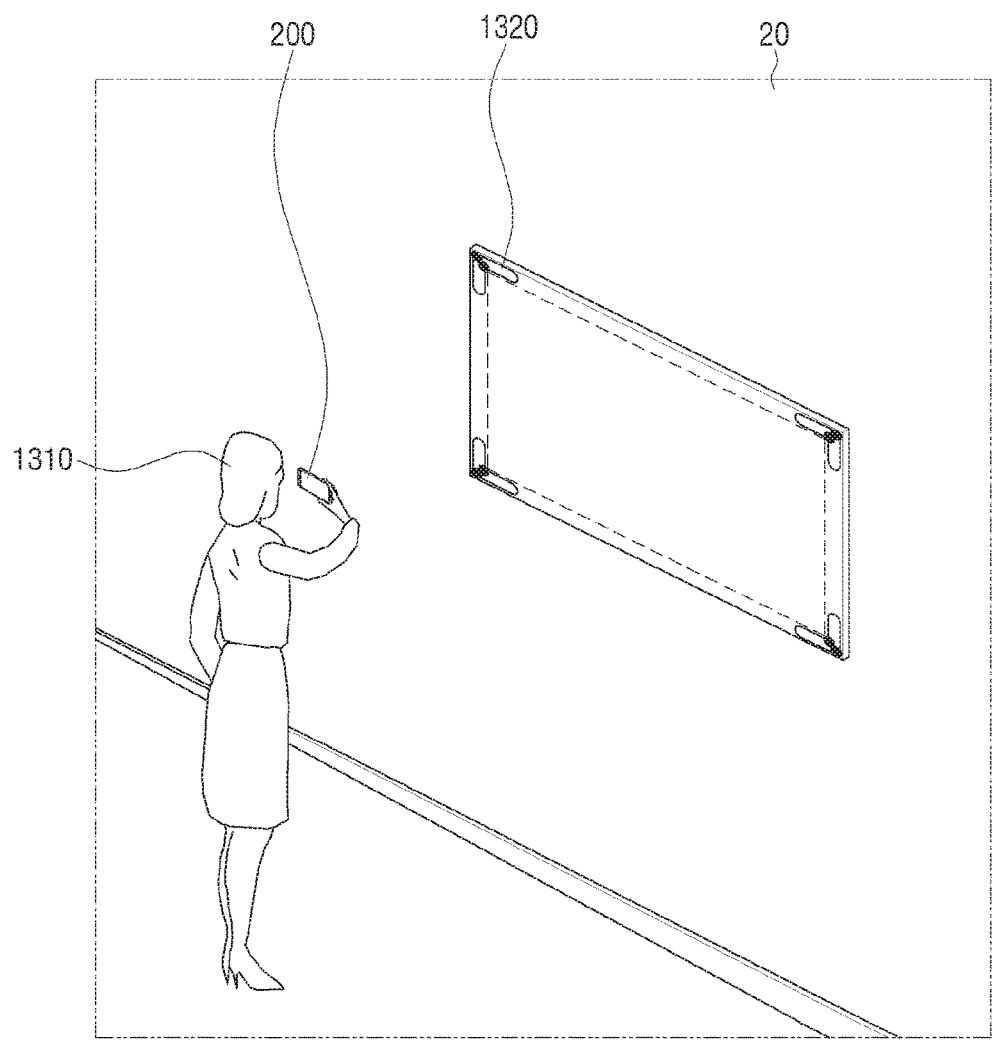
FIG. 13 is a view provided to explain a display system according to an exemplary embodiment.

FIG. 13 is a view provided to explain a display system according to an exemplary embodiment.

Referring to FIG. 13, a user 1310 may capture a marker 1320 attached to the wall surface 20 by using a user terminal device 200. Specifically, the user 1310 may execute a specific application for the display device and capture the marker 1320 attached to the wall surface 20.

The user terminal device 200 may identify an area defined by the marker 1320 of the captured image. Specifically, the user terminal device 200 may recognize the marker 1320 of the image of the wall surface 20 obtained after capturing the image and identify an area in four corners defined by the marker 1320 which is recognized.

The user 1310 may hang the display device to an area of the wall surface 20, where the marker 1320 is attached. Specifically, the display device is a wall type, and the marker 1320 may indicate an area where the display device is to be hung. The marker 1320 may be a sign drawn on a thin sheet. Alternatively, the marker 1320 may be a sign drawn on a member for hanging the display device to the wall or a shape of the member.

The user terminal device 100 may transmit the image corresponding to the area defined by the marker 1320 of the captured image to the display device. In other words, the user terminal device 200 may identify the image corresponding to the area of the wall surface, which is to be hidden when the display device is installed to the wall surface 20 by the marker 1320 and transmit the image corresponding to the marker 1320, which is identified, to the display device.

The display device may display an image received from the user terminal device 200.

It is described that the display device receives the image edited by the user terminal device 200. However, according to another exemplary embodiment, the user terminal device 200 may transmit the captured image to the display device, and the display device may identify the area defined by the marker and display the image corresponding to the partial area of the wall surface 20 of the received image.

According to a display system of an exemplary embodiment, even when the display device is very thin and installed at a very close distance from the wall surface, an image in harmony with the wall surface may be output from the display device by using the user terminal device.

Figure 14:
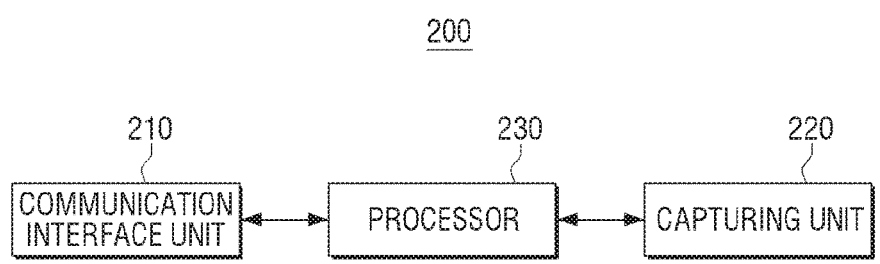
FIG. 14 is a view provided to explain configuration of a user terminal device constituting the display system of FIG. 13.

FIG. 14 is a view provided to explain configuration of a user terminal device constituting the display system of FIG. 13.

Referring to FIG. 14, the user terminal device 200 may include a communication interface unit 210, a capturing unit 220 and a processor 230.

The communication interface unit 210 may perform communication with an external device. Specifically, the communication interface unit 210 may perform communication with the display device. The communication with the display device though the communication interface unit 210 may be performed through direct communication between terminals or over a home network system built in the house or a commercial network.

The communication interface unit 210 may include a communication port and a communication chip for wire/wireless communication. The configuration and function of the communication interface unit 210 corresponds to those of the communication unit 170 of FIG. 11, and thus the detailed description thereof will be omitted.

The capturing unit 220 may capture a subject. Specifically, the capturing unit 220 may capture the subject including a marker attached to the wall surface. The configuration of the function of the capturing unit 220 correspond to those of the front camera 120 and the rear camera 130 shown in FIGS. 2 and 11.

The processor 230 may control each component of the user terminal device 200. Specifically, the processor 230 may transmit at least partial area of the captured image to the display device and control each component to perform a function of displaying the image. The configuration and function of the processor 230 corresponds to those of the processor 150 as shown in FIGS. 2 and 11, and thus detailed description thereof will be omitted.

The processor 230 may transmit the image corresponding to the area defined by the marker of the captured image to the display device. Specifically, the processor 230 may recognize the marker of the image captured by the capturing unit 220, determine a size and a position of the image to be displayed on the display device with reference to the recognized marker, and transmit the image edited to have the determined size and position to the display device.

More specifically, the processor 230 may recognize the shape and color of pre-stored marker based on the captured image, determine an area to be edited and edit the image corresponding to the wall surface according to the determined area.

In another exemplary embodiment, the processor 230 may generate or search the image corresponding to the area defined by the marker, reorganize the generated or retrieved image, and transmit the image to the display device. The processor 230 may analyze the pattern and color of the captured image.

The user terminal device 200 may provide the image corresponding to the partial area of the wall surface to the display device when it is difficult to directly capture the wall surface by the display device.

Figure 15:
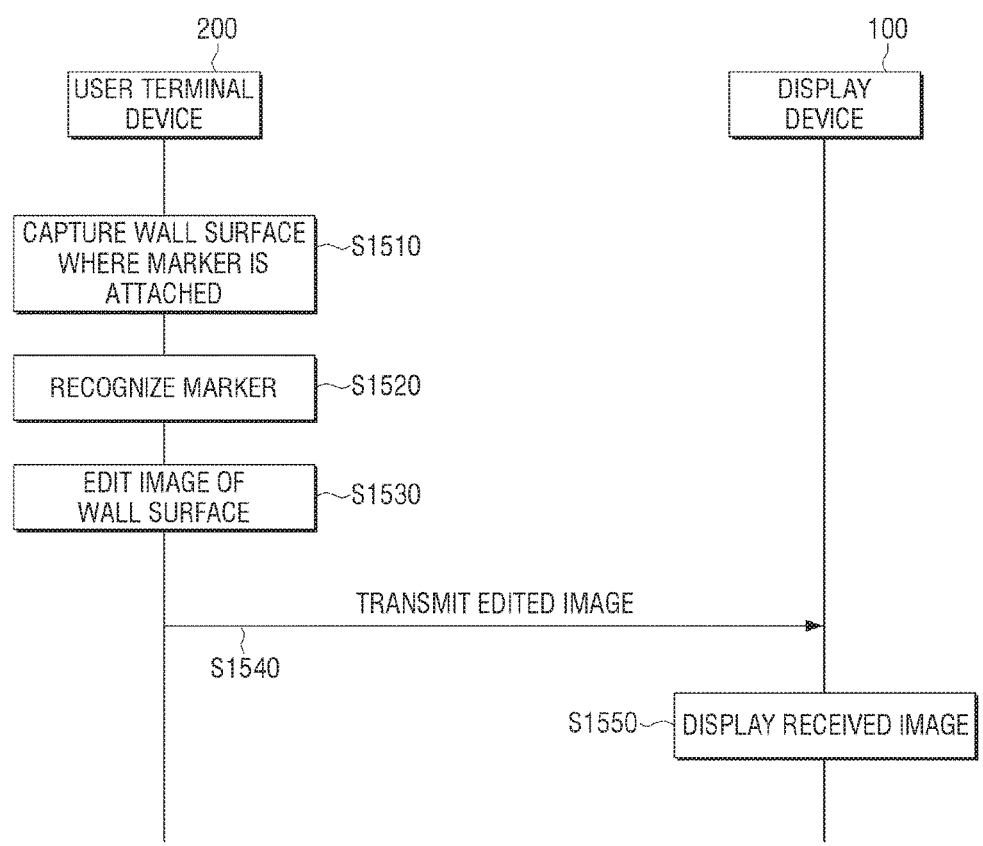
FIG. 15 is a sequence view provided to explain an image displaying method of the display system of FIG. 13.

FIG. 15 is a sequence view provided to explain an image displaying method of the display system of FIG. 13.

Referring to FIG. 15, the display system may include the user terminal device 200 and the display device 100. The display device 100 may not include at least rear camera 130 of the components of the display device 100-2 shown in FIG. 11.

The user terminal device 200 may capture the wall surface where the marker is attached (S1510). In addition, the user terminal device 200 may recognize the marker from the captured image of the wall surface (S1520).

The user terminal device 200 may edit the captured image of the wall surface according to the area defined by the marker with reference to the recognized marker (S1530). For example, the user terminal device 200 may capture a wall surface to which a transparent film is attached at the position where the display device 100 is installed and recognize a mark drawn on the film based on the captured image. In addition, the user terminal device 200 may edit the image of the wall surface captured along the rectangular area having the recognized marks at the four corners. The marks may be displayed at the four corners of the area having the size corresponding to the display of the display device.

The user terminal device 200 may transmit the edited image to the display device 100 (S1540).

The display device 100 receiving the image from the user terminal device 200 may display the received image (S1550). For example, the display device 100 may check whether the image received from the user terminal device 200 corresponds to the wall surface and display the image of the wall surface edited along the marker area in a full screen.

As such, the method of displaying the image may include outputting the image in harmony with the wall surface without expanding additional components of the box type display device closely attached to the wall surface.

FIG. 16 is a view illustrating two examples of a screen of a display device according to an exemplary embodiment.

Referring to FIG. 16, the display device 100 may display an image 1610 corresponding to the partial area hidden by the display device 100 of the wall surface 20 behind the display device 100.

In addition, the display device 100 may display other contents having the image corresponding to the partial area of the wall surface as background. Referring to FIG. 16(A), the display device 100 may have the image 1610 of the wall surface as background by synthesizing with another image 1620. The displayed image 1620 may be a static picture or a video animation for giving a three-dimensional sense.

Referring to FIG. 16(B), the display device 100 may have the image 1610 of the wall surface as background and display widgets 1630 and 1640 for executing a clock application. The display device 100 in an example shown in FIG. 16(B) may indicate the days of week, current time 1630 and an icon 1640 for indicating a state where an alarm is set.

The method of displaying the image may enhance applicability and functionality of the display device.

It has been described that all the components constituting the exemplary embodiment are combined in one or are combined to operate, but this is not limited thereto. For example, at least one or more of all the components may be selectively combined to operate within the object scope. Each of the components may be implemented with one piece of independent hardware, but a part or all of the components may be selectively combined to be implemented with computer program having a program module which performs a part or all of functions combined in one or a plurality of pieces of hardware. Codes and code segments constituting the computer program may be easily construed by those skilled in the art. The exemplary embodiment may be implemented by storing the computer program or method in a non-transitory computer-readable medium and reading and executing the computer program through a computer.

Here, the non-transitory computer readable medium may refer, for example, to a medium that semi-permanently stores data therein and is readable by a device. In detail, the programs described above may be stored and provided in the non-transitory computer readable medium such as a CD, a digital versatile disk (DVD), a hard disk, a Blu-ray disk, a USB, a memory card, a ROM, or the like.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A display device, comprising:
a display;
a front camera;
a rear camera;
a sensor unit; and
a processor configured to:
   identify a position of a user based on an image captured by the front camera, and
   control the display to display an image, which is captured by the rear camera, corresponding to a partial area of a wall surface positioned behind the display device in a direction where the display device is positioned, with reference to the position of the user, based on the position of the user and a distance between the display device and the wall surface that is measured by the sensor unit, wherein
the processor is further configured to:
   obtain a direction and a distance from the display device to the position of the user based on the image captured by the front camera,
   identify an area of the image corresponding to the partial area of the wall surface based on the obtained direction from the display device to the position of the user,
   identify a size of the image corresponding to the partial area of the wall surface based on the distance from the display device to the position of the user, and
   control the display to display the image corresponding to the partial area of the wall surface based on at least one of the identified area or the size of the image corresponding to the partial area of the wall surface.

2. The display device as claimed in claim 1, wherein the partial area of the wall surface is a partial area of the wall surface hidden by the display device of the wall surface positioned in the direction where the display device is positioned with reference to the position of the user.

3. The display device as claimed in claim 1, wherein the processor is configured to identify the size of the image corresponding to the partial area of the wall surface of a captured image of the wall surface by using a ratio between the distance from the display device to the position of the user obtained by the processor and a size of a front surface of the display device, and the distance between the display device and the wall surface that is measured by the sensor unit.

4. The display device as claimed in claim 1, wherein the rear camera includes a wide angle lens, and
wherein the processor compensates barrel distortion of a captured image of the wall surface caused by the wide angle lens and controls the display to display the image corresponding to the partial area of the wall surface of the compensated image of the wall surface.

5. The display device as claimed in claim 1, wherein the rear camera captures a rear view of the display device in a direction forming an angle with a vertical axis of a tangent plane of the display, compensates keystone distortion of a captured image of the wall surface caused by a capturing direction, and controls the display to display the image corresponding to the partial area of the wall surface of the compensated image of the wall surface.

6. The display device as claimed in claim 1, wherein the processor analyzes a pattern and a color of the wall surface based on a captured image of the wall surface captured by the rear camera, generates an image including the analyzed color and pattern, and controls the display to display the image corresponding to the partial area of the wall surface in the direction where the display device is positioned, with reference to the position of the user, based on the position of the user and the distance between the display device and the wall surface.

7. The display device as claimed in claim 1, wherein the processor analyzes a pattern and a color of the wall surface based on a captured image of the wall surface captured by the rear camera, searches an image having the analyzed pattern of pre-stored images, and based on the position of the user and the distance between the display device and the wall surface, controls the display to display the image corresponding to the partial area of the wall surface in the direction where the display device is positioned with reference to the position of the user.

8. The display device as claimed in claim 1, wherein the processor controls the display to display a screen including a picture or an animation having the image corresponding to the partial area of the wall surface as background or a widget executing a specific application.

9. The display device as claimed in claim 8, further comprising:
light sensor configured to sense light amount,
wherein the processor controls the display to adjust brightness for displaying the image corresponding to the partial area of the wall surface according to the sensed light amount.

10. The display device as claimed in claim 1, wherein, in a case where a plurality of users are captured by the front camera, the processor is configured to determine an average position between determined positions of the plurality of users as the position of the user that is used in controlling the display to display the image corresponding to the partial area of the wall surface.

11. A display device, comprising:
a display;
a front camera;
a rear camera;
a sensor unit; and
a processor configured to:
identify a position of a user based on an image captured by the front camera, and
control the display to display an image, which is captured by the rear camera, corresponding to a partial area of a wall surface positioned behind the display device in a direction where the display device is positioned, with reference to the position of the user, based on the position of the user and a distance between the display device and the wall surface that is measured by the sensor unit, wherein
the processor is further configured to:
based on the image captured by the front camera, with reference to a center of the display, calculate an angle of rotation from a vertical axis of a tangent plane of the display in a direction of the position of the user and a distance from the center of the display to the position of the user,
calculate a viewing angle for viewing an entire front surface of the display device at the calculated distance on the vertical axis,
calculate a width and a height of the partial area of the wall surface hidden by the display device when the rotated angle is added to the calculated viewing angle, and
control the display to display an image having a size corresponding to the calculated width and height.

12. A method of displaying an image of a display device, the method comprising:
capturing a user positioned in front of the display device and a wall surface positioned behind the display device;
measuring a distance between the display device and the wall surface;
identifying a position of the user based on a captured image of the user; and
displaying an image corresponding to a partial area of the wall surface in a direction where the display device is positioned, with reference to the position of the user, based on the position of the user and the distance between the display device and the wall surface that is measured, wherein
the identifying of the position of the user comprises obtaining a direction and a distance from the display device to the position of the user based on the captured image of the user, and
the displaying comprises:
identifying an area of the image corresponding to the partial area of the wall surface based on the obtained direction from the display device to the position of the user,
identifying a size of the image corresponding to the partial area of the wall surface based on the distance from the display device to the position of the user, and
displaying the image corresponding to the partial area of the wall surface based on at least one of the identified area or the size of the image corresponding to the partial area of the wall surface.

13. The method as claimed in claim 12, wherein the partial area of the wall surface is a partial area of the wall surface hidden by the display device of the wall surface in the direction where the display device is positioned with reference to the position of the user.

14. The method as claimed in claim 12,
wherein the displaying comprises identifying the size of the image corresponding to the partial area of the wall surface of a captured image of the wall surface by using a ratio between the obtained distance from the display device to the position of the user and a size of a front surface of the display device, and the measured distance between the display device and the wall surface.

15. The method as claimed in claim 12, wherein the wall surface is captured by a rear camera including a wide angle lens, and
wherein the displaying comprises compensating barrel distortion of a captured image of the wall surface due to the wide angle lens and displaying the image corresponding to the partial area of the wall surface of the compensated image of the wall surface.

16. The method as claimed in claim 12, further comprising:
capturing at least one additional user positioned in the front of the display device; and determining a position of the at least one additional user based on a captured image of the at least one additional user, wherein the displaying the image corresponding to the partial area of the wall surface is performed based on an average position between the determined positions of the user and the at least one additional user.

17. A method of displaying an image of a display device, the method comprising:

capturing a user positioned in front of the display device and a wall surface positioned behind the display device;

measuring a distance between the display device and the wall surface;

identifying a position of the user based on a captured image of the user; and displaying an image corresponding to a partial area of the wall surface in a direction where the display device is positioned, with reference to the position of the user, based on the position of the user and the distance between the display device and the wall surface that is measured, wherein the identifying of the position of the user comprises based on the captured image of the user, with reference to a center of the display, calculating an angle of rotation from a vertical axis of a tangent plane of the display to the position of the user, and a distance from the center of the display to the position of the user, and wherein the displaying comprises calculating a viewing angle for viewing an entire front surface of the display device at the calculated distance on the vertical axis, calculating a width and a height of the partial area of the wall surface hidden by the display device when the rotated angle is added to the calculated viewing angle, and displaying an image having a size corresponding to the calculated width and height.

* * * * *